United States Patent [19]
Lipo et al.

[11] Patent Number: 5,825,112
[45] Date of Patent: Oct. 20, 1998

[54] DOUBLY SALIENT MOTOR WITH STATIONARY PERMANENT MAGNETS

[75] Inventors: Thomas A. Lipo; Yuefeng Liao; Feng Liang, all of Madison, Wis.

[73] Assignee: Electric Power Research Institute, Inc., Palo Alto, Calif.

[21] Appl. No.: 926,765

[22] Filed: Aug. 6, 1992

[51] Int. Cl.[6] .............................. H02K 1/00; H02K 1/14; H02K 1/12
[52] U.S. Cl. ............................................ 310/181; 310/168
[58] Field of Search ..................................... 310/154, 181, 310/106, 269, 49 R, 161, 163, 164, 179, 162, 254; 318/701

[56] References Cited

U.S. PATENT DOCUMENTS

| | | | |
|---|---|---|---|
| 2,539,569 | 1/1951 | Clark | 171/212 |
| 2,816,240 | 12/1957 | Zimmerman | 310/155 |
| 3,408,556 | 10/1968 | Gabor | 310/269 |
| 3,616,761 | 11/1971 | Valls | 104/148 R |
| 3,783,502 | 1/1974 | Richter et al. | 29/598 |
| 3,862,445 | 1/1975 | Volkrodt | 310/154 |
| 3,984,711 | 10/1976 | Kordick | 310/49 R |
| 4,011,479 | 3/1977 | Volkrodt | 310/154 |
| 4,081,703 | 3/1978 | Madsen et al. | 310/49 R |
| 4,097,754 | 6/1978 | Farr | 310/67 R |
| 4,110,646 | 8/1978 | Rao | 310/163 |
| 4,348,605 | 9/1982 | Torok | 310/168 |
| 4,472,651 | 9/1984 | Jones | 310/156 |
| 4,629,921 | 12/1986 | Gavaletz | 310/156 |
| 4,631,510 | 12/1986 | Nagarkatti et al. | 336/135 |
| 4,712,028 | 12/1987 | Horber | 310/49 R |
| 4,733,117 | 3/1988 | Perrins | 310/162 |
| 4,752,707 | 6/1988 | Morrill | 310/184 |
| 4,827,164 | 5/1989 | Horber | 310/49 R |
| 4,896,088 | 1/1990 | Jahns | 318/107 |
| 4,916,346 | 4/1990 | Kliman | 310/216 |
| 4,939,398 | 7/1990 | Lloyd | 310/156 |
| 4,972,112 | 11/1990 | Kim | 310/154 |
| 5,051,640 | 9/1991 | Freise | 310/162 |
| 5,059,884 | 10/1991 | Shah et al. | 318/701 |
| 5,097,190 | 3/1992 | Lyons | 318/701 |
| 5,117,144 | 5/1992 | Torok | 310/269 |
| 5,148,090 | 9/1992 | Oku | 318/107 |

Primary Examiner—Clayton E. LaBalle
Attorney, Agent, or Firm—Leonard Bloom

[57] ABSTRACT

A new class of doubly-salient motors which incorporate a specific stator/rotor pole arrangement and stationary permanent magnets mounted in the stator to provide a linearly increasing flux linkage over the entire area of pole overlap. The new motors provide greater output torque, higher efficiency, quicker response, and a simpler structure in comparison to conventional reluctance motors.

13 Claims, 11 Drawing Sheets

Flux Map at $\Theta_d = 0$ degrees

Flux Map at Θd=15 degrees

Simulation Results for the Motor at Low Speed

Simulation Results for the Motor at High Speed

DOUBLY SALIENT MOTOR WITH STATIONARY PERMANENT MAGNETS

BACKGROUND OF THE INVENTION

1. Field of the Invention

The present invention relates to permanent magnet machines and, more particularly, to a high-output permanent magnet motor incorporating a doubly salient structure and, in addition, stationary permanent magnets in the stator. The doubly salient structure alters the magnetic circuit of the motor to provide the necessary flux linkage variation of each phase during rotation to mount the permanent magnets in the stator.

2. Description of the Background

In a variable reluctance motor (VRM), torque is generated by a doubly-salient rotor and stator which tend to align themselves in order to reach a position of minimum magnetic reluctance. Under ideal switching conditions, VRMs have the potential to be highly efficient. Moreover, VRMs can be constructed with shorter end-windings, and they use less end-space. Hence, the length of the rotor and stator can be increased without adding to the overall motor dimensions or manufacturing costs. In this manner, the torque output can be increased substantially over a comparably-sized synchronous or induction motor.

Thus far, the VRM has fallen short of its above-described potential for two reasons. First of all, like all single excited motors, the VRM suffers from an "excitation penalty," i.e., the armature current must provide an excitation component. Hence, the VRM has a lower efficiency and lower power factor (or energy ratio) as compared with other motors wherein the stator current is solely for torque production. Secondly, ideal switching conditions do not exist, and attempts to achieve such conditions have resulted in commercially impractical converter circuits with excessive voltage and current stresses imparted to the switching devices. In a continuous drive variable reluctance motor, the current in each phase should be decreased to zero immediately when the rotor is aligned with that phase. The problem lies in the existence of a large turn-off inductance. The phase inductance is a maximum when the rotor is aligned with that phase. Since this large inductance will draw a residual current due to the energy stored in the magnetic field, the current in each phase cannot immediately be decreased to zero when the rotor reaches alignment. Consequently, the decaying residual current induces a detrimental reverse-torque as the rotor pole passes alignment with the corresponding stator pole. The problem is most serious when the speed of the motor is high.

As a result, those skilled in the art view present VRM technology with some skepticism. Synchronous or induction motors remain the industry choice.

It would be greatly advantageous to realize the full potential of a VRM by solving the above-described problems without increasing the complexity and cost of the converter or the motor. Co-pending application Ser. No. 07/881,202 provides one solution in the form of a high-output permanent magnet motor incorporating one or more rotary permanent magnets in the rotor. The rotary permanent magnets alter the magnetic structure of the motor to improve the flux linkage variation of each phase during current commutation.

SUMMARY OF THE INVENTION

It is an object of the present invention to provide an improved switched reluctance motor equipped with permanent magnets to permit an economical variable speed drive system with greater output torque, higher efficiency, quicker response, and a simpler structure in comparison to conventional motor drives.

It is another object of the present invention to accomplish objectives similar to those set forth in co-pending application Ser. No. 07/881,202 using stationary permanent magnets mounted in the stator rather than in the rotary magnetic structure as set forth in said co-pending application.

It is another object of the present invention to enable the motor to run at higher speed by moving the permanent magnets shown in co-pending application Ser. No. 07/881,202 to the stator.

It is another object of the present invention to reduce the manufacturing cost of the motor by employing stationary rather than rotational permanent magnets.

It is another object of the present invention to provide a more convenient field weakening operation by employing stationary permanent magnets.

It is another object of the present invention to substantially reduce the inductance of the motor during instants when the current must be rapidly changed thereby reducing the VA requirement of the associated power converter.

According to the present invention, the above-described and other objects are accomplished by providing a new type of doubly-salient permanent magnet motor with stationary permanent magnets (i.e., a "DS$^2$PM" motor). The DS$^2$PM comprises a rotor having a multiple of four salient poles spaced at equal angular intervals around a central axis. The motor also includes a stator having a multiple of six salient poles spaced at equal angular intervals and three stator windings corresponding to three phase alternating current. Each stator winding is coiled around pairs of diametric stator poles, for example, in the 6/4 stator/rotor pole embodiment each stator winding is coiled around one pair of diametric stator poles, in the 12/8 stator/rotor pole embodiment each stator winding is coiled around two pairs of diametric stator poles, etc.

The stator further comprises a plurality of planar permanent magnets located on opposing sides of the stator to serve as a means for producing magnetizing flux.

The permanent magnets are shaped in parallelepipeds and are arranged on diametric sides of the stator to serve as a source of flux for magnetizing the reluctance motor.

In a second embodiment of the invention the permanent magnets are each sandwiched between a pair of steel insets.

BRIEF DESCRIPTION OF THE DRAWINGS

Other objects, features, and advantages of the present invention will become more apparent from the following detailed description of preferred embodiments and certain modifications thereof when taken together with the accompanying drawings in which.

DETAILED DESCRIPTION OF THE PREFERRED EMBODIMENT

Figure 1:
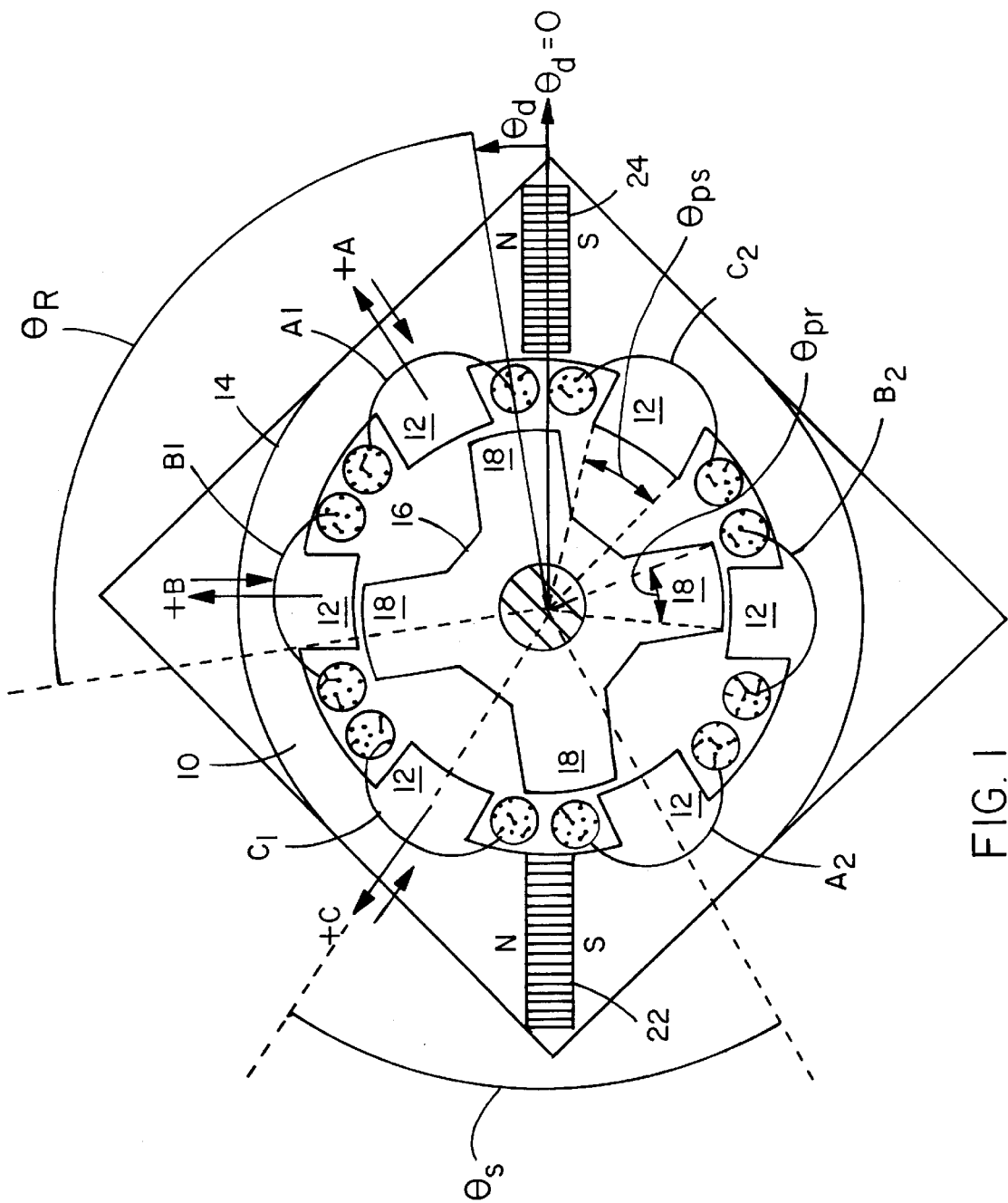
FIG. 1 shows a cross-section of a doubly salient stationary permanent magnet motor according to one embodiment of the present invention.

FIG. 1 shows a cross-section of a doubly salient stationary permanent magnet motor ($DS^2PM$) according to one embodiment of the present invention.

A stator 10 consists of a plurality of discrete laminated layers, each layer being punched to form six salient (or projecting) poles 12 positioned at angular intervals $\theta_s$ of $\pi/3$ radians. Each pole 12 has a pole arc $\theta_{ps}$ of $\pi/6$ radians.

The rotor 16 also consists of a plurality of discrete laminated layers each of which are punched to form four salient poles 18 positioned at angular intervals $\theta_r$ of $\pi/2$. Each pole 18 also has a pole arc $\theta_{pr}$ equal to or slightly greater than $\pi/6$ radians.

In the $DS^2PM$ embodiment of FIG. 1, stator 10 is wound with three short pitch windings A, B, C corresponding to three phase alternating current. Each short pitch winding (for example, the winding of phase A) further comprises two short pitch coils $A_{1-2}$ connected in series, and the coils $A_1$ and $A_2$ of each winding are wound around a diametric pair of stator poles 12.

It will be appreciated by those skilled in the art that other suitable stator/rotor pole arrangements are possible. For example, any multiple of 6/4 stator/rotor poles may be used, such as 12/8, etc. Similarly, combinations with other than three phases are possible. The essential feature is that the total overlapping stator/rotor pole areas must remain constant over 360° of rotation. This way, a constant reluctance is presented to the permanent magnet flux.

The winding arrangement of FIG. 1 yields the following exemplary alternating phase sequence during one complete revolution:

A—B—C—A

An essential feature of the embodiment of FIG. 1 comprises two permanent magnets 22 and 24 which are embedded inside the stator 10. The inclusion of permanent magnets 22 and 24 in the stator 10 rather than the rotor 16 (as disclosed in co-pending application Ser. No. 07/881,202) has distinct advantages in that the motor is able to run at higher speed, the motor may be manufactured at a lower manufacturing cost, and the motor lends itself to better field weakening operation performance.

In the embodiment of FIG. 1, permanent magnets 22 and 24 are incorporated without unduly increasing the overall motor size. The plurality of discrete laminated stator 10 layers are punched with open slots, preferably at two diametric corners. This makes use of the corner space (the corners are usually discarded anyway). Sufficient room is therein provided for mounting permanent magnets 22 and 24 within the opposing slots.

Since the permanent magnets 22 and 24 are stationary, the magnetic force between the stator 10 and permanent magnets 22 and 24 is great enough to hold the permanent magnets in the two slots. Hence, any conventional fixative can be used to secure the permanent magnets 22 and 24.

Preferably, permanent magnets 22 and 24 are parallelepipeds, and they may be formed by binding multiple smaller magnets. Permanent magnets 22 and 24 are parallely located on opposing sides of the stator 10. The permanent magnets 22 and 24 themselves generate the primary flux, and a secondary (armature reaction) flux is induced by the stator pole windings A, B, C. Due to their air-like permeability, permanent magnets 22 and 24 present a very high bi-planar reluctance which blocks the ordinary path of the secondary flux through the stator 10.

The particular stator pole 12 and rotor pole 18 arrangement of the present invention ensures that the total overlapped pole area remains constant for all positions of rotor 16. This way, the total air-gap reluctance (which is the primary reluctance for the permanent magnet excitation) is invariant to rotor 16 displacement $\theta_d$, and there exists a substantially linear transfer of permanent magnet flux between adjacent stator poles 12 during rotation of rotor 16. Consequently, permanent magnets 22 and 24 produce no cogging torque at no load.

Since torque is produced as a result of the change of flux linkage in the active stator winding(s) A, B, C, there is a reaction torque component caused by the interaction of stator winding current and the permanent magnet flux, and there is a reluctance torque component caused by the variation in the reluctance of the magnetic path of the winding A, B, C. Hence, the present invention works on the variable reluctance principle as well as permanent magnet brushless DC motor principles.

Figure 2:
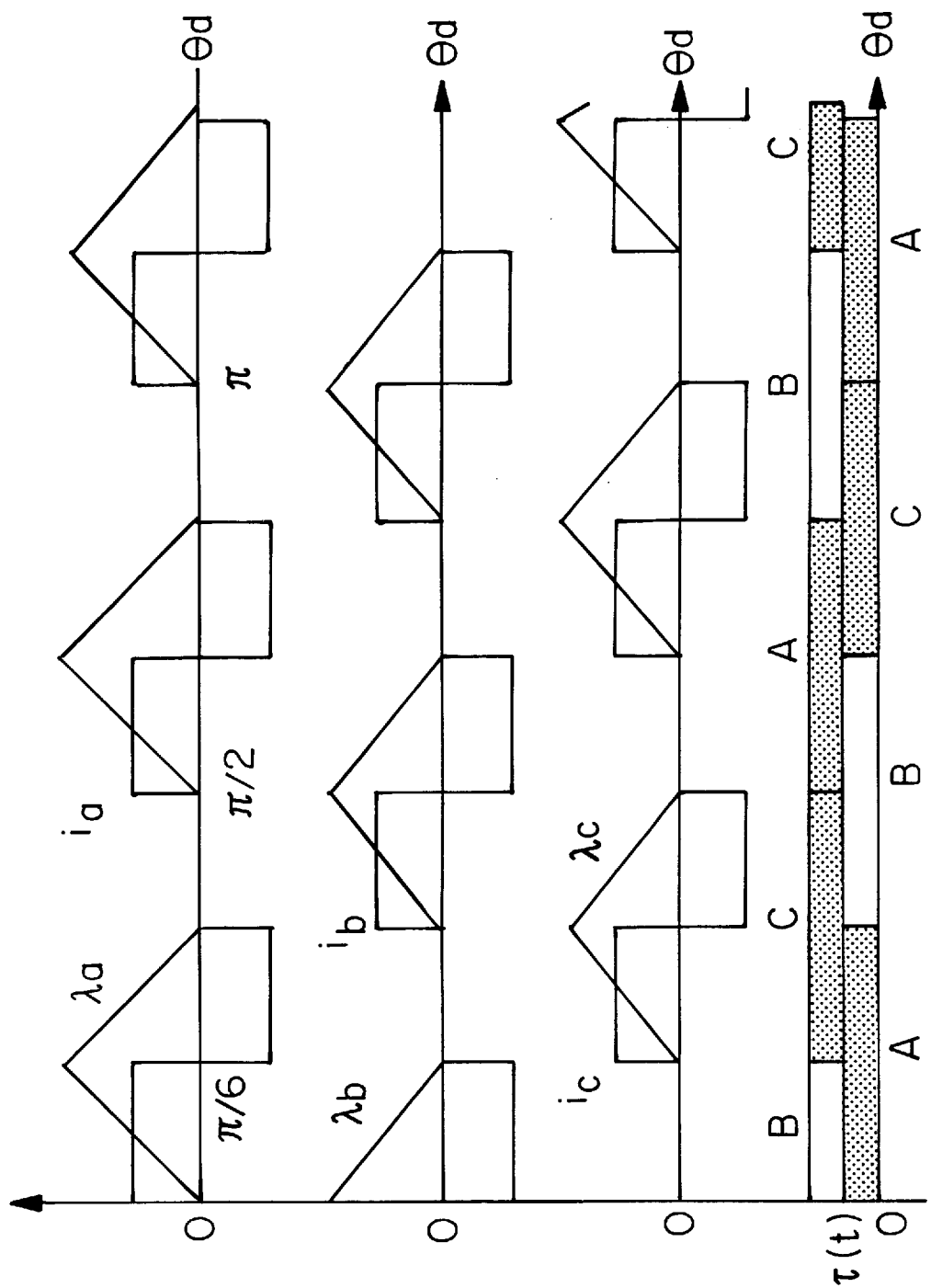
FIG. 2 is a graph of the currents $i_{a-c}$ and the corresponding flux linkages $\lambda_{a-c}$ in each of the respective phases A, B, C resulting from the permanent magnets 22 and 24 in the embodiment of FIG. 1.

FIG. 2 shows the variations of the currents i and the corresponding flux linkages λ in each phase resulting from the permanent magnets 22 and 24.

As shown in FIG. 2, the flux linkage $\lambda a$, $\lambda b$, and $\lambda_c$ of each stator pole 12 increases at a constant rate for continuing rotor 16 displacement $\theta_d$ until full alignment of a diametric pair of stator poles 12 and rotor poles 18. Past alignment, the flux linkages $\lambda_{a-c}$ of the respective pole pairs decrease at a constant rate.

In the preferred mode of operation, positive current is injected into a given phase when the magnetic flux linking that phase is increasing, and negative current is injected when the magnetic flux is decreasing. Consequently, positive torque is produced over the entire area of overlap of an active stator pole 12 and rotor pole 18 pair. This essentially doubles the torque production when compared with a conventional VRM which can only produce torque while the phase inductance is increasing.

The torque expression for the present invention may be derived as follows on per phase basis. The voltage equation in the active phase winding A-e can be written as follows (neglecting all copper and iron losses):

$$V_a = E_a = \frac{d}{dt} \Phi a$$

where $$\Phi_a = \Phi_{as} + \Phi_{am} = L_a I_a + K_\Phi \Phi_p \Theta_r$$

with $$K_\Phi = N_\Phi / \beta_s$$

where $N_\Phi$: total series turns per phase
$\beta_s$: stator pole width (in rad.)
$\theta_r$: angular interval between salient rotor and stator reference points
$\Phi_p$: flux per pole
$V_a$: voltage applied to phase winding A
$E_a$: counter emf in phase winding A
$I_a$: current in phase winding A
$\Phi_a$: air gap flux linkages linking phase winding A and rotor (does not include leakage flux)
$\Phi_{as}$: portion of $\Phi_a$ due to $I_a$
$\Phi_{am}$: portion of $\Phi_a$ due to magnet
$L_a$: inductance of phase winding A
$K_\Phi$: proportionality constant between flux linkages linking stator pole produced by the magnet and flux produced by one pole of the magnet hence $$V_a = \frac{d}{dt}(L_a I_a) + K_\Phi \Phi_p \frac{d}{dt} \Theta_r$$

$$= \left( I_a \frac{d}{dt} L_a + L_a \frac{d}{dt} I_a \right) + K_\Phi \Phi_p \omega$$

$$= \left( I_a \frac{d}{dt} L_a + L_a \frac{d}{dt} I_a \right) + E_m$$

The input power is thus $$P_e = V_a I_a = I_a^2 \frac{d}{dt} L_a + L_a I_a \frac{d}{dt} I_a + E_M I_a$$

$$= \left( \frac{1}{2} I_a^2 \frac{d}{dt} L_a + L_a I_a \frac{d}{dt} I_a \right) + \left( \frac{1}{2} I_a^2 \frac{d}{dt} L_a + E_m I_a \right)$$

$$= \frac{d}{dt} \left( \frac{1}{2} I_a^2 L_a \right) + \left( \frac{1}{2} I_a^2 \left( \frac{d}{d\Theta_r} L_a \right) + \frac{E_m I_a}{\omega_r} \right) \omega_r$$

Power balance gives $$P_e = \frac{d}{dt} W_f + T_e \omega_r$$

Hence we have $$T_e = \frac{1}{2} \left( \frac{d}{d\Theta_r} L_a \right) I_a^2 + \frac{E_m I_a}{\omega_r}$$

$$= T_{er} + T_{em}$$

and $$W_f = \frac{1}{2} I_a^2 L_a$$

where $P_e$: electrical power input to motor (watts)
$T_e$: total electromagnetic torque of motor (newton-meters)
$T_{er}$: portion of $T_e$ resulting from saliency of the poles
$T_{em}$: portion of $T_e$ resulting from interaction between flux produced by $I_a$ and flux produced by magnet
$W_f$: energy stored in magnetic field
$W_r$: $d\Theta_r/dt$ Careful examination of the foregoing equations reveals the following unique features of the present invention:

(i) The armature reaction field energy $W_f$, which is to be recovered during current commutation, is greatly reduced because of the much smaller value of the stator 10 inductance. Therefore, the energy ratio, or equivalently, the power factor is very high. The smaller value of the stator inductance also makes the dynamic response of the motor much faster. Specifically, the stator windings A, B, C meet small permeances at both aligned and unaligned positions, even though a great deal of permanent magnet flux concentration is achieved under the overlapped pole pairs where electromagnetic torque is produced. As a result, the active stator phase winding will experience very small turn-on and turn-off inductances, thereby facilitating short commutation periods upon turn-on and turn-off.

(ii) Because of the triangle-shaped flux-linkage variation $\lambda_a$, the reluctance torque $\tau_{er}$ will be of zero average if the current is kept constant. The current may be kept constant at low speed by chopping. However, the net reluctance torque will be non-zero if the current is varying, as is the case of single pulse operation at high speed. Therefore, the motor will pick up a net reluctance torque at high speed, which will compensate for the loss of the reaction torque. This yields a considerable constant power range.

(iii) The reaction torque $\tau_{em}$, which is the dominant torque component, can be produced by applying either a positive current to a phase winding A, B, or C when its flux linkage is increasing (or $E_m > 0$) or a negative current to a phase winding A, B, or C when its flux linkage is decreasing (or $E_m < 0$). This makes it possible to make use of both torque producing zones, thus greatly increasing the torque production capability of the motor as long as the current can be reversed at aligned position as shown in FIG. 2.

Figure 3:
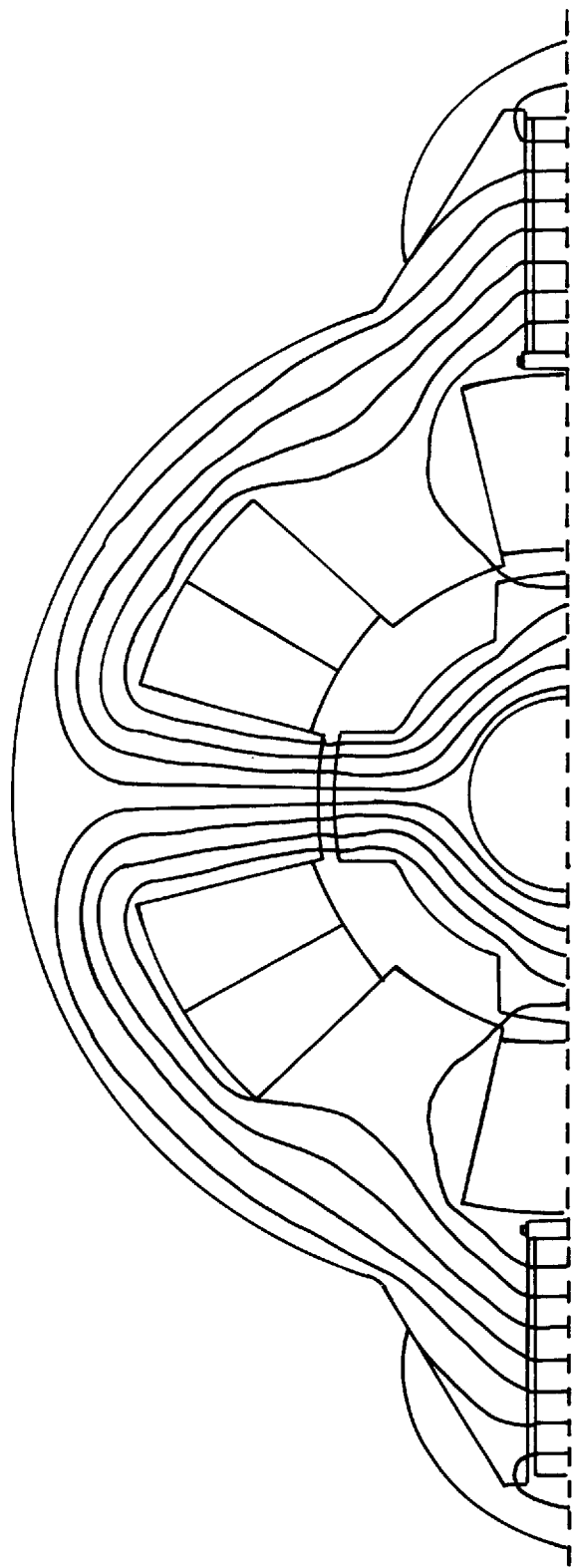
FIGS. 3 and 4 are flux contour plots for two time instants wherein $\theta_d=0°$ and $\theta_d=15°$, respectively, which illustrate the flux distribution in the embodiment of FIG. 1;.
Figure 4:
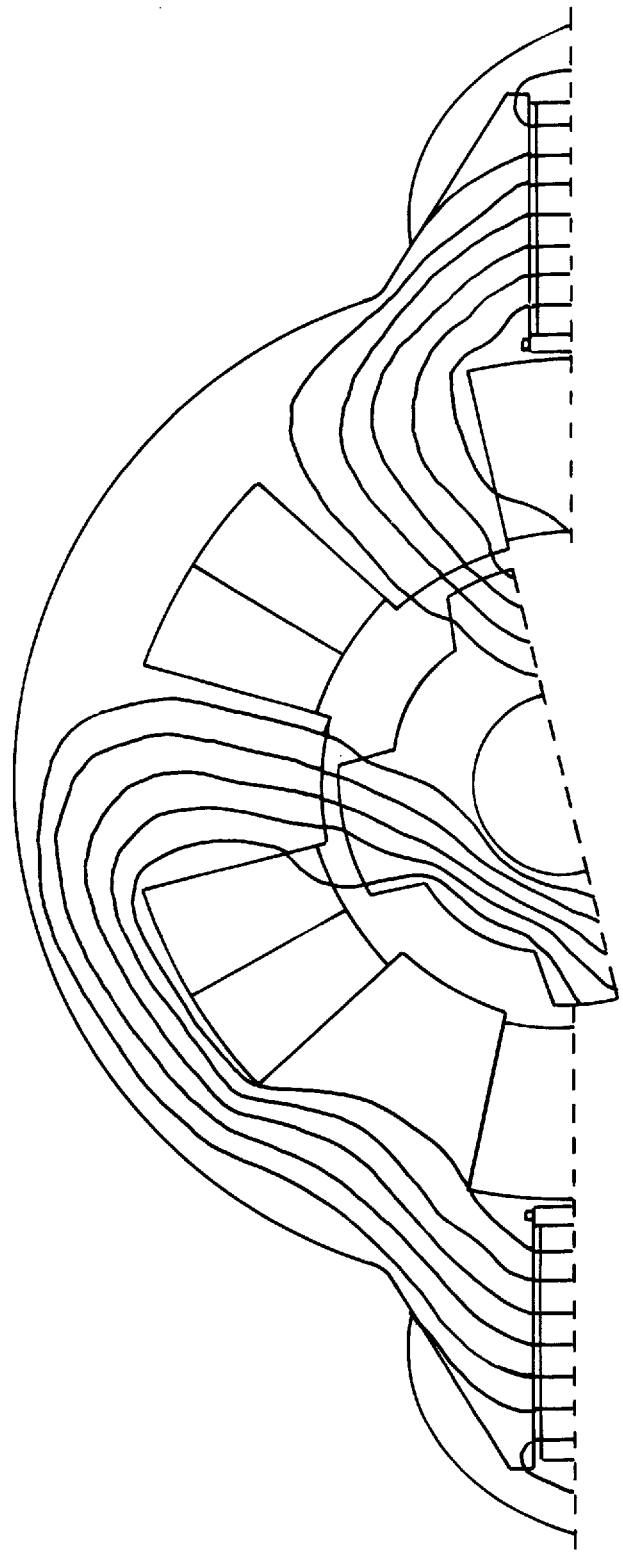

FIGS. 3 and 4 are flux contour plots for two time instants wherein $\theta_d = 0°$ and $\theta_d = 15°$, respectively, the flux contour plots being illustrative of the flux distribution in the embodiment of FIG. 1.

Figure 5:
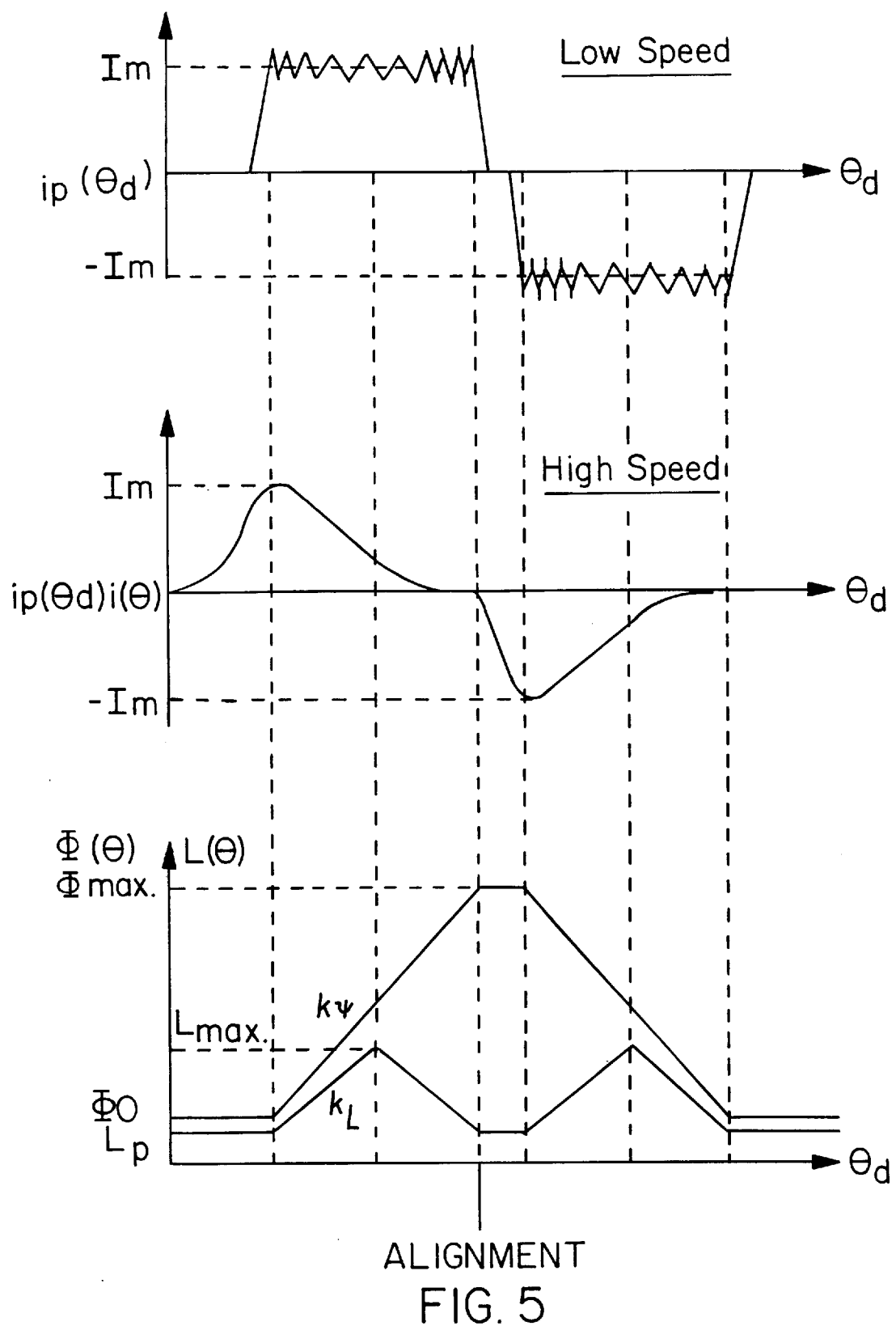
FIG. 5 illustrates actual current $i_p$ waveforms, inductance $L_p$ waveforms, and flux $\Phi_p$ waveforms per pole as functions of rotor 16 displacement $\theta_d$ for the embodiment of FIG. 1.

FIG. 5 illustrates actual current $i_p$ waveforms (at both high speed and low speed), inductance $L_p$ waveforms, and flux $\Phi_p$ waveforms per pole as functions of rotor 16 displacement $\theta_d$. It can be seen in FIG. 5 that the motor of the present invention is endowed with a small turn-off inductance Lp at the phase alignment position, which means the current ip in the active phase can decay to zero rapidly after the phase is turned off. It can also be seen in FIG. 5 that the inductance $L_p$ is decreasing after the rotor poles pass the half overlapped position. Hence, the back emf due to the variation of the inductance reverses polarity after the half overlapped position. This reversal of polarity actually assists in the current reversal process because the back emf due to the inductance $L_p$ variation now adds algebraically to the applied voltage before the phase is turned off. Therefore, it is always possible to power the motor of the present invention using a bi-directional (or bi-polar) converter as well as a unidirectional converter.

To prevent the generation of additional heat, the current provided to the stator windings A–C by a bi-directional converter must be scaled down to $\sqrt{2}/2$ times that for a unidirectional converter. With the scaled current, bi-directional operation will still increase the torque density of the motor by an advantageous $\sqrt{2}$ times. However, it will be appreciated by those skilled in the art that the increase is obtained at the expense of the simplicity of a unipolar converter.

Control of the invention can be accomplished in the same manner as a conventional variable reluctance motor, i.e., four quadrant operation is easily achieved by changing the sequence of conduction and the direction of current.

Figure 6:
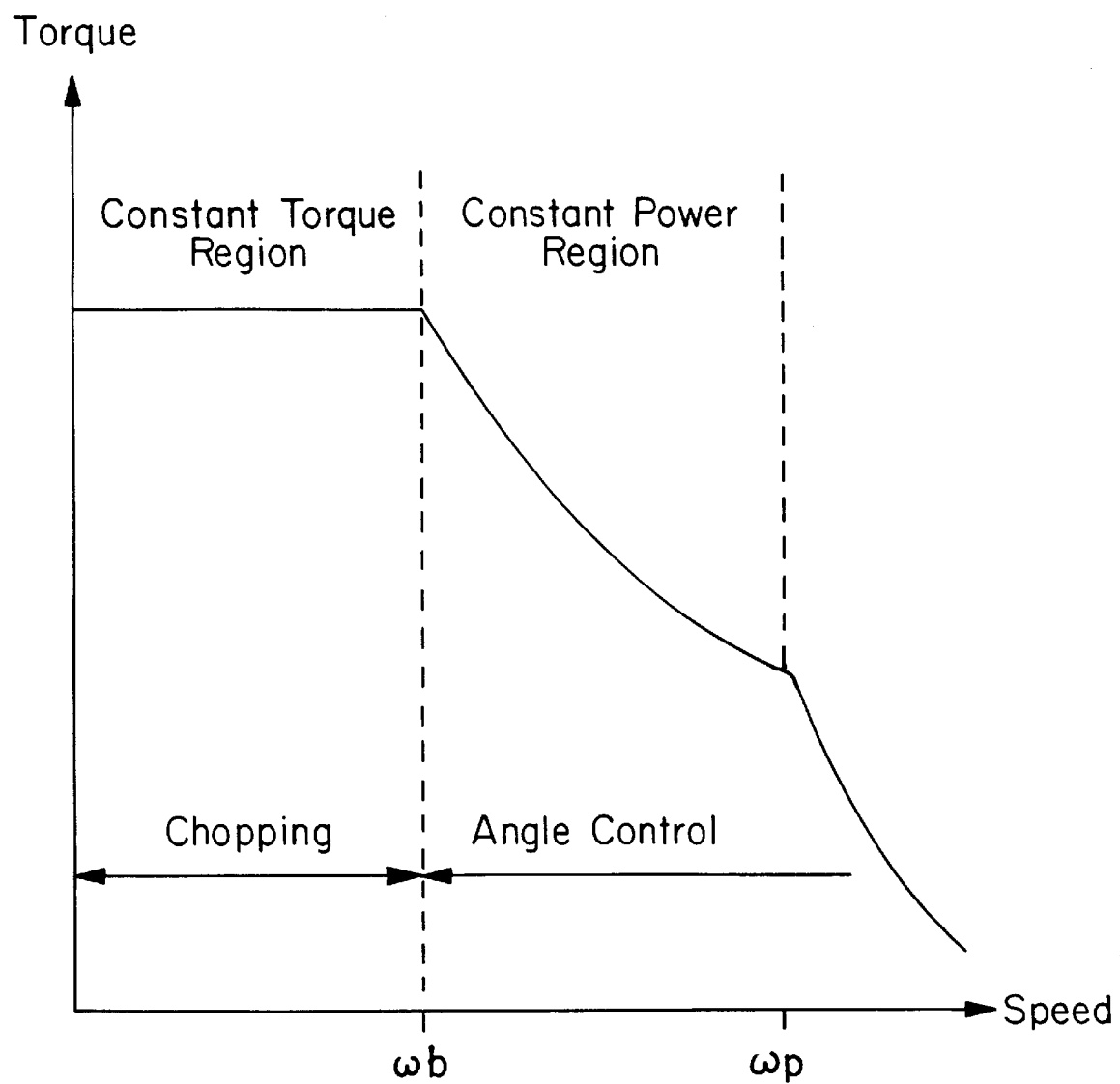
FIG. 6 is a torque capability curve for the embodiment of FIG. 1 showing torque as a function of speed ω.

FIG. 6 is a torque capability curve for the present invention showing torque as a function of speed $\omega$. FIG. 6 is further illustrative of the above-described control. Below a base speed $\omega_b$, current chopping is the preferred technique to obtain smoother torque production. Above the base speed $\omega_b$, single current-pulse operation gives a considerable constant power range (field weakening range). The variation of the stator 10/rotor 16 reaction inductance plays a critical role for achieving the constant power range, although the same variation causes torque pulsation in the above-described current-chopping region. While in the current-chopping region, it is possible to program a custom current waveform, such as a ramp, to eliminate the torque pulsation due to reluctance torque at low speed. The presence of reluctance torque in addition to reaction torque during field weakening enhances the torque production during this mode of operation and serves to widen the range for which constant power can be maintained.

It is noteworthy that the residual permanent magnet flux can be monitored by detecting the induced emf in phase that is not carrying current at any instant to detect the rotor 16 position, thus eliminating the need for complex encoders.

Figure 7:
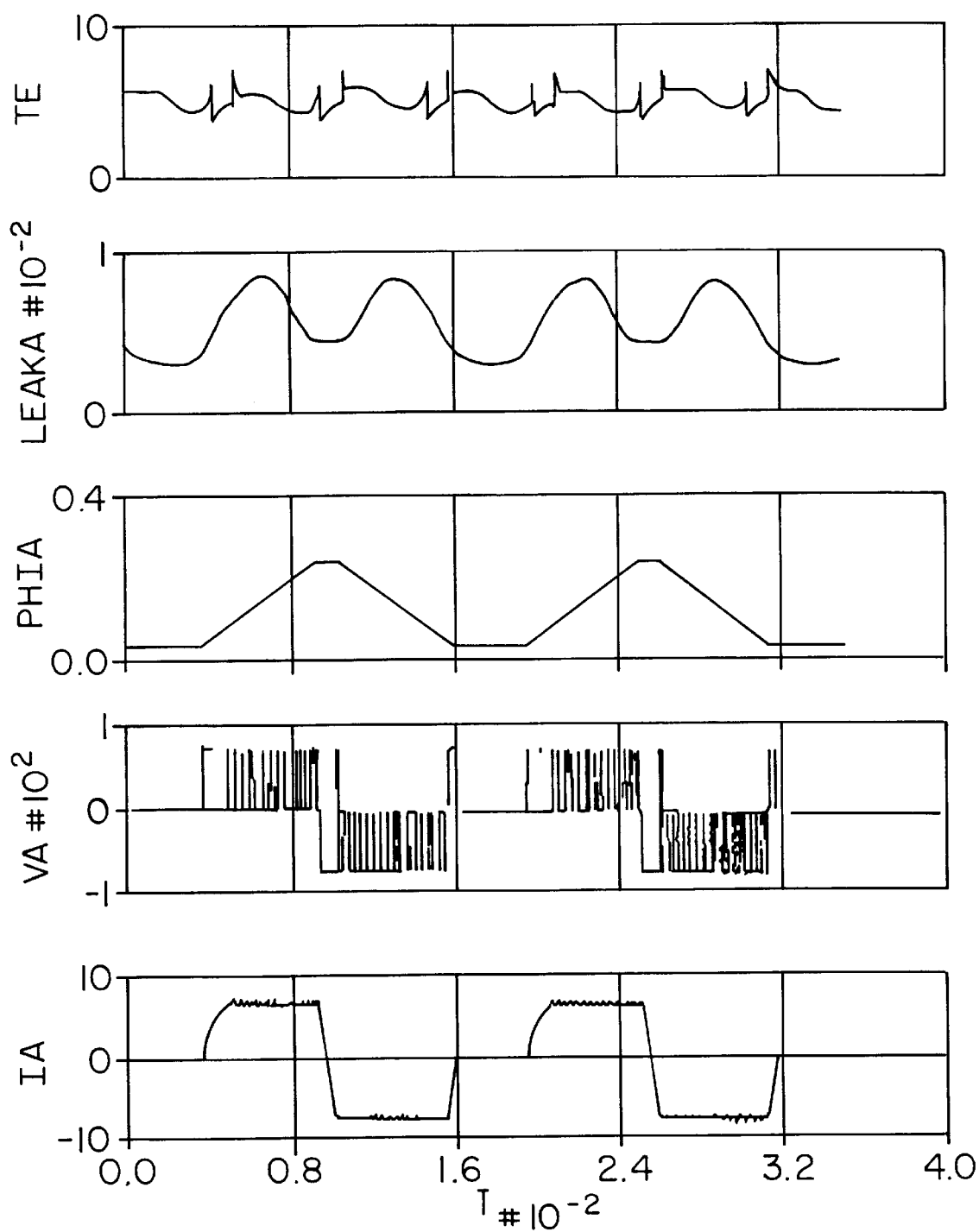
FIG. 7 is a computer simulation trace showing typical voltage $V_a$, current $I_a$, and torque $T_{ea}$ waveforms per phase (phase A being exemplary) during low speed operation of the embodiment of FIG. 1.

FIG. 7 is a computer simulation trace showing typical voltage $V_a$, current $I_a$, and torque TE waveforms per phase (phase A being exemplary) during low speed operation of the present invention. The idealized current waveform of FIG. 5 can be accurately approximated by using a pulse width modulated (PWM) inverter. Note that the current $I_a$ of each phase can be rapidly changed from one level to another as was suggested in the idealized waveforms of FIGS. 2 and 5. Also noteworthy is the torque waveform TE which shows relatively small torque ripple compared to a conventional variable reluctance motor.

Figure 8:
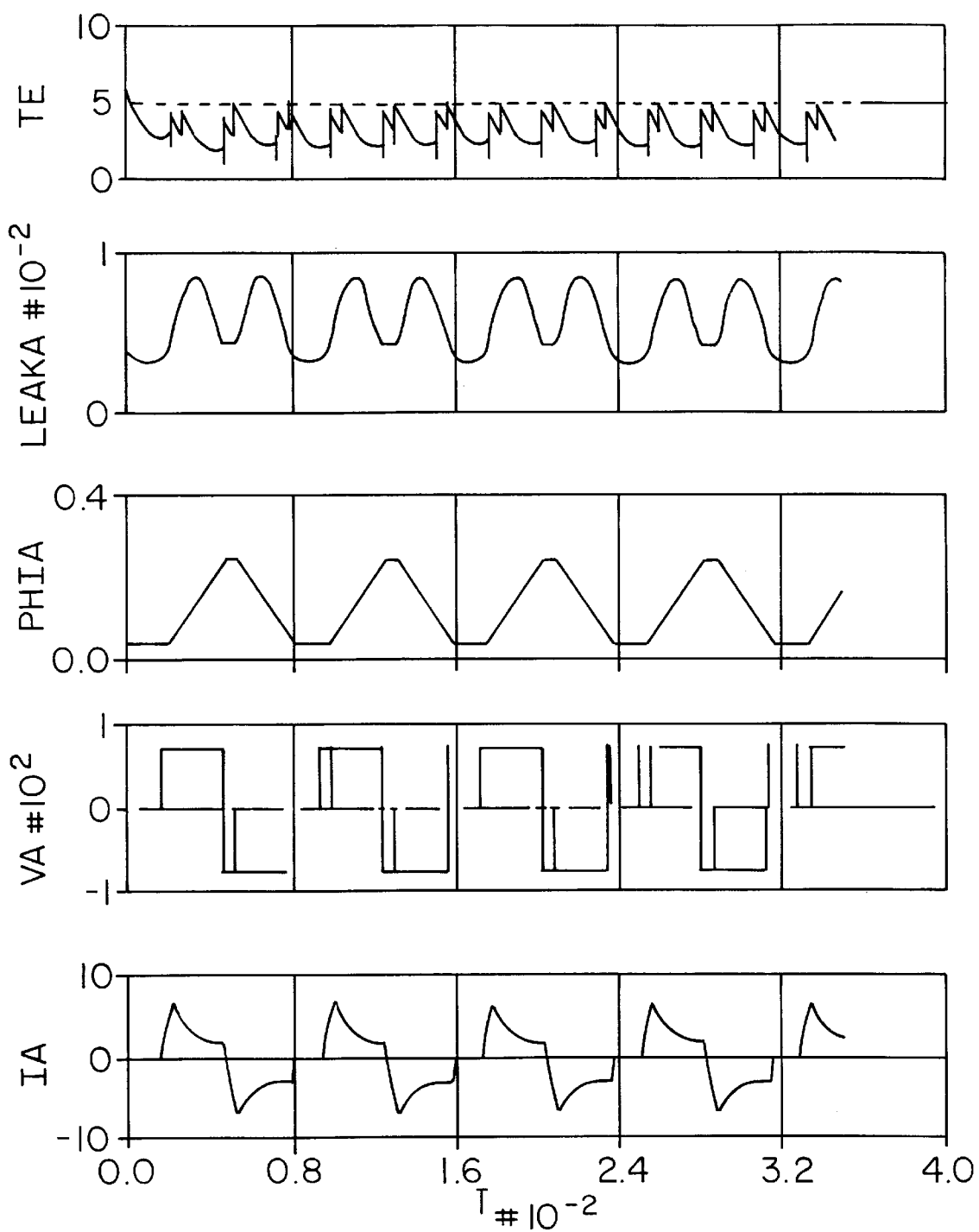
FIG. 8 is a computer simulation trace showing typical voltage $V_a$, current $I_a$, and torque $T_{ea}$ waveforms per phase (phase A being exemplary) during high speed operation of the embodiment of FIG. 1.

FIG. 8 is a computer simulation trace showing typical voltage $V_a$, current $I_a$, and torque TE waveforms per phase (phase A being exemplary) during high speed operation of the present invention. At high speeds, the ideal current waveform of FIG. 5 can not be accurately controlled by means of pulse-width modulation since the counter-emf has increased to a point where it is comparable with the voltage capability of the inverter, i.e., field weakening or constant power mode operation.

Figure 9A:
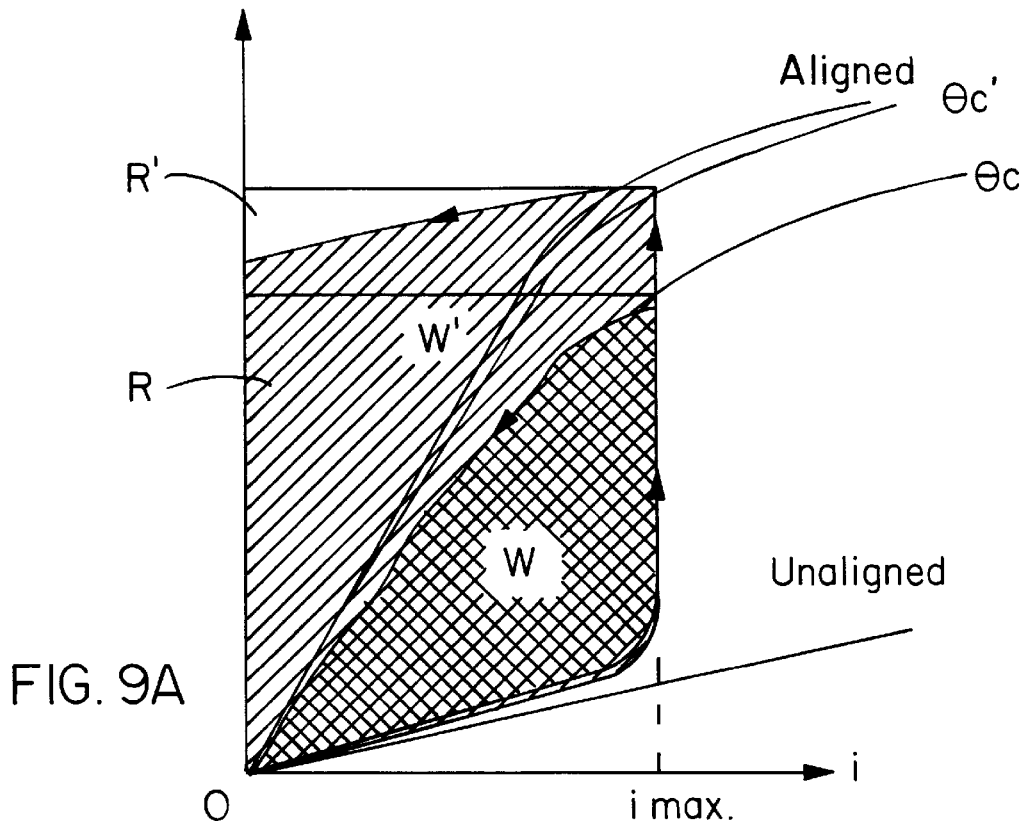
FIG. 9A is a comparative graph showing the flux vs. current loci for small, e.g., 5 KW, versions of a conventional variable reluctance motor (VRM) contrasted with the doubly salient stationary permanent magnet ($DS^2PM$) embodiment of FIG. 1 when operated with a unipolar converter.

FIG. 9A is a comparative graph showing the flux vs. current loci for small, e.g., 5 KW versions of a conventional variable reluctance motor (VRM) and a permanent magnet motor with doubly salient structure ($DS^2PM$) operated with a unipolar converter according to the present invention. The torque produced in one stroke is represented by the area W for the conventional variable reluctance motor and W' for the present invention. As shown in FIG. 9A, the area, W' for the present invention, is bigger than W for the variable reluctance motor due to the fact that the restored field energy i.e., energy returned to the converter, represented by the area R, is only a small fraction of the total field energy, and the turn-off occurs closer to alignment because a smaller inductance is encountered.

Figure 9B:
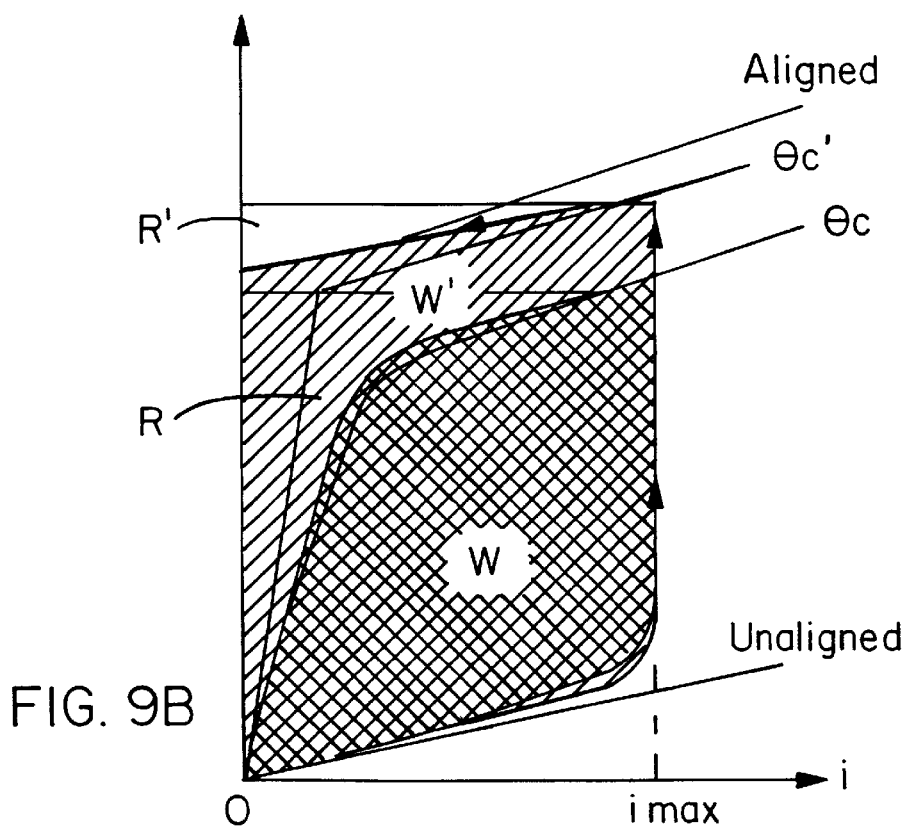
FIG. 9B is a comparative graph showing the flux vs. current loci for large, e.g., 100 KW, versions of a conventional variable reluctance motor (VRM) contrasted with the doubly salient permanent magnet ($DS^2PM$) embodiment of FIG. 1 when operated with a unipolar converter.

FIG. 9B is a comparative graph similar to FIG. 9A except that the machines being compared are large machines, e.g., 100 KW. The fact that the increase in the area W' over the area W is smaller in FIG. 9B than in FIG. 9A demonstrates that the application of the invention to small machines produces greater advantages than the application of the invention to large machines when the machines are operated with a unipolar converter.

Figure 10A:
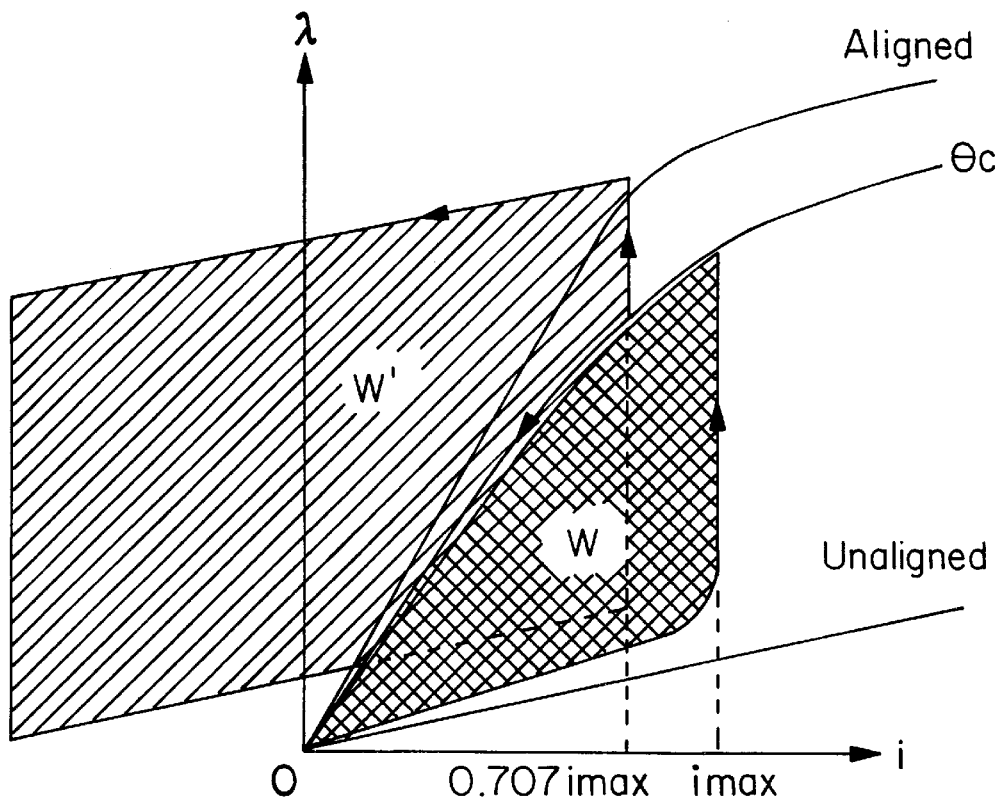
FIG. 10A is a comparative graph showing the flux vs. current loci for small, e.g., 5 KW, versions of a conventional variable reluctance motor (VRM) and the doubly salient stationary permanent magnet ($DS^2PM$) embodiment of FIG. 1 when operated with a bi-polar converter.

FIG. 10A is a comparative graph showing the flux vs. current loci for small, e.g., 5 KW, versions of a conventional variable reluctance motor (VRM) and a permanent magnet motor with doubly salient structure ($DS^2PM$) operated with a bipolar converter according to the present invention. As shown in FIG. 10A, the torque production increases by a factor of $\sqrt{2}$ in the $DS^2PM$ of the present invention. Hence, it should be clear that the present invention can achieve two to three times (ideally $\sqrt{2}$ to $2\sqrt{2}$ times) the torque density of that of a comparable switched reluctance motor.

Figure 10B:
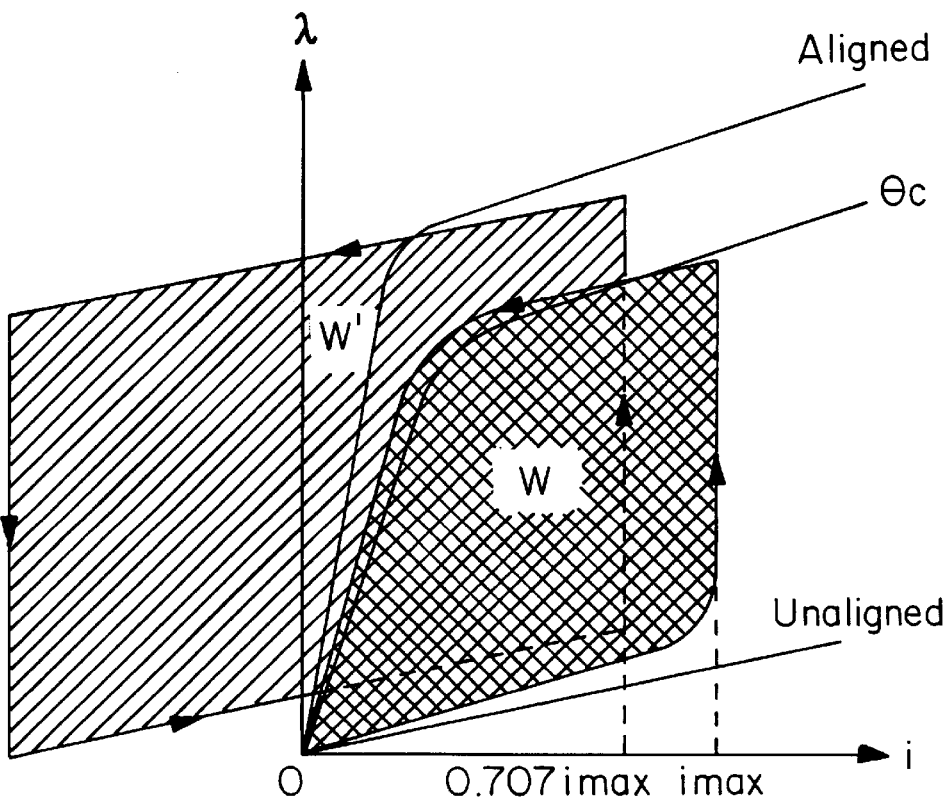
FIG. 10B is a comparative graph showing the flux vs. current loci for large, e.g., 100 KW, versions of a conventional variable reluctance motor (VRM) contrasted with the doubly salient permanent magnet ($DS^2PM$) embodiment of FIG. 1 when operated with a bi-polar converter.

FIG. 10B is a comparative graph similar to FIG. 10A except that the machines being compared are large machines, e.g., 100 KW. FIGS. 10A and 10B show that in the case of machines operated with a bipolar converter, the degree of improvement afforded by application of the invention to large machines is nearly the same as the degree of improvement provided by application of the invention to small machines.

Figure 11:
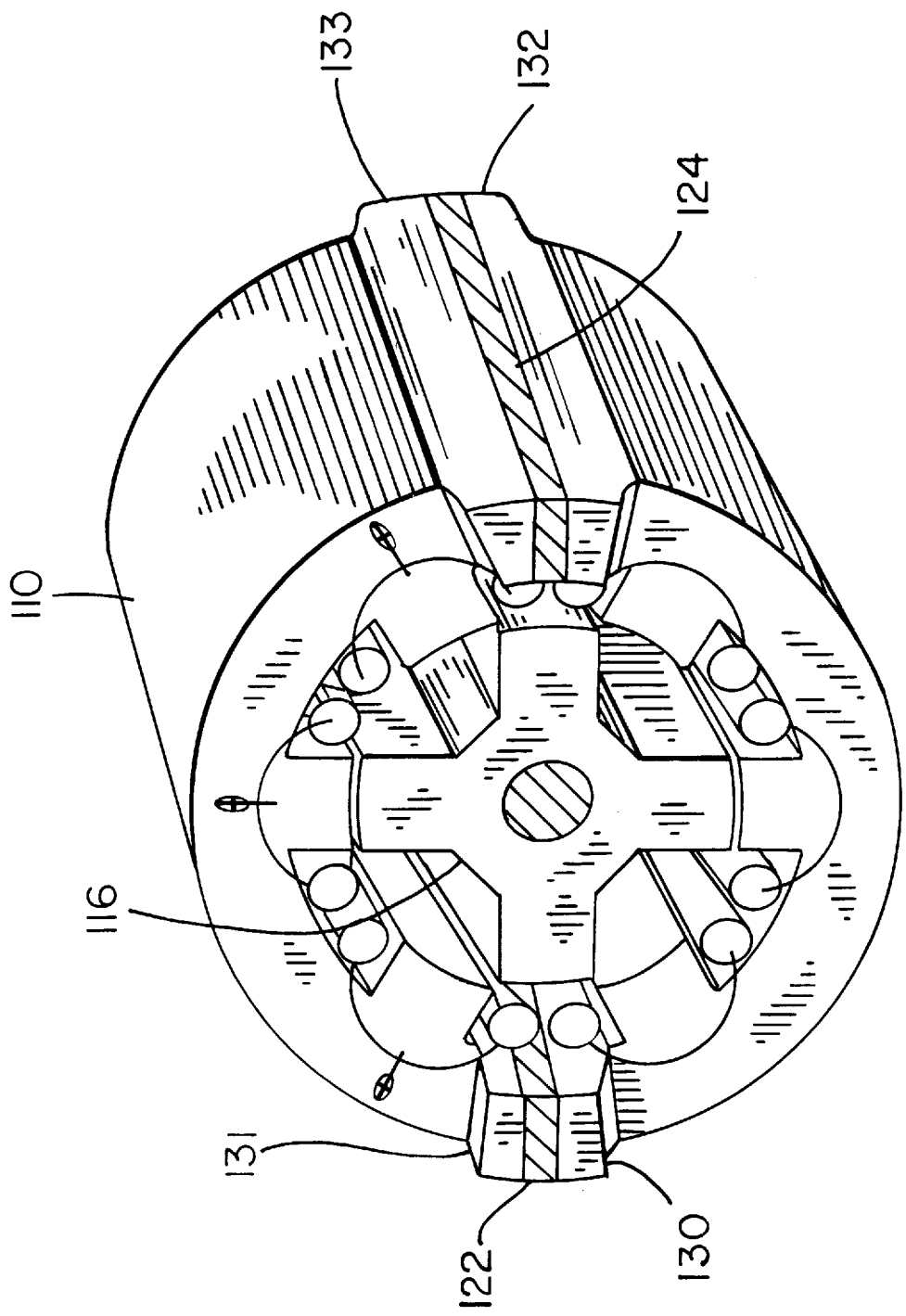
FIG. 11 illustrates a side cross-section of a second embodiment of the present invention.

FIG. 11 illustrates a side cross-section of a second embodiment of the present invention which has a smaller aspect ratio, i.e., the ratio of the outer diameter of the motor divided by the length. The aspect ratio is smaller because the square-shaped stator of FIG. 1 is replaced with a rounded stator 110.

As shown in FIG. 11, the permanent magnets 122 and 124 are each sandwiched between two pieces of laminated steel insets 130–133. The steel insets 130–133 are mounted in the stator 110 and extend to the end region of the stator 110. This way, the permanent magnet flux is concentrated into the stator 110 through the respective pairs of laminated steel insets 130 and 131 and 132 and 133. The operation of the embodiment shown in FIG. 11 is in all other respects the same as that described above with respect to FIG. 1.

The advantage of the embodiment shown in FIG. 11 is that the volume of the motor can be reduced. However, a trade-off may occur because the manufacturing cost may be higher.

Having now fully set forth the preferred embodiments and certain modifications of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

We claim:

1. A permanent magnet motor comprising:

a rotor mounted for rotation about a central axis, said rotor further comprising, a plurality of salient rotor poles spaced at equal angular intervals around said central axis; and a stator symmetrically formed around said central axis so as to encircle said rotor, said stator further comprising, a plurality of salient stator poles spaced at equal angular intervals around said central axis, said stator poles being arranged with respect to said rotor poles to provide a constant air-gap reluctance during rotation of said rotor within said stator, and a plurality of permanent magnets shaped in two elongate parallelepipeds parallely spaced and symmetrically positioned within said stator in the plane of said central axis, each of said parallelopipeds being positioned between a pair of said stator poles on diametric sides of said central axis, said magnets being so polarized as magnetize as north magnetic poles the ones of said stator poles lying to one side of the plane containing said magnets and to magnetize as south magnetic poles the ones of said stator poles lying to the side opposite said one side of the plane containing said magnets.

2. The permanent magnet motor of claim 1, wherein said plurality of stator poles further comprises a multiple of six stator poles evenly spaced at angular intervals equal to a multiple of $\pi/3$ radians.

3. The permanent magnet motor of claim 2, wherein said stator poles have a pole arc equal to a multiple of $\pi/6$ radians.

4. The permanent magnet motor of claim 2, wherein said plurality of rotor poles further comprise a multiple of four rotor poles evenly spaced at angular intervals equal to a multiple of $\pi/2$ radians.

5. The permanent magnet motor of claim 4, wherein said rotor poles have a pole arc equal to a multiple of $\pi/6$ radians.

6. The permanent magnet motor of claim 4, wherein said permanent magnets each have planar faces which are angularly displaced by a multiple of $\pi/6$ radians from one of said stator poles.

7. The permanent magnet motor of claim 4, wherein said stator further comprises a plurality of stator windings corresponding to an equal number of phases, each stator winding being coiled around two diametric stator poles.

8. A permanent magnet motor comprising:

a rotor mounted for rotation about a central axis, said rotor having four salient rotor poles spaced at equal angular intervals around said central axis; and a stator symmetrically formed around said central axis so as to encircle said rotor, said stator having six salient stator poles spaced at equal angular intervals around said central axis, and three stator windings corresponding to three phases, each said stator winding being coiled around two diametric stator poles, said stator further comprising a plurality of permanent magnets shaped in two elongate parallelepipeds parallelly spaced and symmetrically positioned within said stator in the plane of said central axis, each of said parallelopipeds being positioned between a pair of said stator poles on diametric sides of said stator, said magnets being so polarized as magnetize as north magnetic poles three of said stator poles lying to one side of the plane containing said magnets and to magnetize as south magnetic poles three of said stator poles lying to the side opposite said one side of the plane containing said magnets.

9. The permanent magnet motor of claim 8, wherein said rotor poles are arranged with respect to said stator poles to provide a constant air-gap reluctance during rotation of said rotor within said stator.

10. The permanent magnet motor of claim 9, wherein said stator poles are equally spaced at angular intervals of $\pi/3$ radians.

11. The permanent magnet motor of claim 10, wherein said stator poles have a pole arc of $\pi/6$ radians.

12. The permanent magnet motor of claim 11, wherein said rotor poles are equally spaced at angular intervals of $\pi/2$ radians.

13. The permanent magnet motor of claim 12, wherein said rotor poles have a pole arc equal to or slightly greater than $\pi/6$ radians.

* * * * *